US012331002B2

(12) United States Patent
Hojjatie et al.

(10) Patent No.: US 12,331,002 B2
(45) Date of Patent: *Jun. 17, 2025

(54) STABILIZED UREA FERTILIZER COMPOSITIONS AND METHODS FOR PREPARING SAME

(71) Applicant: Tessenderlo Group NV, Brussels (BE)

(72) Inventors: Michael Massoud Hojjatie, Tucson, AZ (US); Thomas David Fairweather, Dundee, OR (US); Jeroen Van Cauwenbergh, Baardegem (BE); Martijn Timmermans, Lommel (BE); Heidi van den Rul, Genk (BE)

(73) Assignee: Tessenderlo Group NV, Brussels (BE)

( * ) Notice: Subject to any disclaimer, the term of this patent is extended or adjusted under 35 U.S.C. 154(b) by 1004 days.

This patent is subject to a terminal disclaimer.

(21) Appl. No.: 17/266,588

(22) PCT Filed: Aug. 7, 2019

(86) PCT No.: PCT/US2019/045546
§ 371 (c)(1),
(2) Date: Feb. 6, 2021

(87) PCT Pub. No.: WO2020/033576
PCT Pub. Date: Feb. 13, 2020

(65) Prior Publication Data
US 2021/0309583 A1 Oct. 7, 2021

Related U.S. Application Data

(60) Provisional application No. 62/716,252, filed on Aug. 8, 2018.

(30) Foreign Application Priority Data

Sep. 19, 2018 (EP) .................... 18195472

(51) Int. Cl.
*C05G 3/90* (2020.01)
*C05C 9/00* (2006.01)
*C05G 5/30* (2020.01)

(52) U.S. Cl.
CPC ............... *C05G 3/90* (2020.02); *C05C 9/00* (2013.01); *C05C 9/005* (2013.01); *C05G 5/36* (2020.02)

(58) Field of Classification Search
CPC .... C05G 3/90; C05G 5/36; C05C 9/00; C05C 9/005
See application file for complete search history.

(56) References Cited

U.S. PATENT DOCUMENTS

| 4,530,714 | A | 7/1985 | Kolc et al. |
| 5,097,799 | A * | 3/1992 | Heitfeld ............... A01K 1/0152 119/172 |
| 2006/0185411 | A1 | 8/2006 | Hojjatie et al. |
| 2007/0077428 | A1* | 4/2007 | Hamed ................. D06M 16/00 428/375 |
| 2014/0037570 | A1 | 2/2014 | Whitehurst |
| 2017/0050895 | A1* | 2/2017 | Ortiz-Suarez ........... C05C 11/00 |

FOREIGN PATENT DOCUMENTS

| EP | 0376853 A1 | 7/1990 |
| WO | 2016070184 A1 | 5/2016 |
| WO | 2017/125383 A1 | 7/2017 |

OTHER PUBLICATIONS

PCT International Search Report and Written Opinion for PCT/US2019/045546, dated Nov. 8, 2019, 13 pages.

* cited by examiner

*Primary Examiner* — Wayne A Langel
(74) *Attorney, Agent, or Firm* — N.V. Nederlandsch Octrooibureau

(57) ABSTRACT

Provided in the invention is a stabilized fertilizer composition (I) suitable for use in fertilizers and comprising: Urea (a), One or more compounds (b), One or more urease inhibitors (c1) and/or one or more nitrification inhibitors (c2), optionally provided in one or more carriers (d), said compounds (c) being different from compounds (b), Optionally one or more additives (e) different from any of the above, and Water (f) in an amount less than about 10 wt % and preferably less than about 5 wt %; wherein compounds (b) are selected from thiosulfates (b1) and/or from polysulfides (b2) and/or from (bi)sulfites (b3); and wherein the ratio of urea (a) to compounds (b) is from 1:99 to 99:1, preferably from 2:98 to 98:2. Products of the invention can be made in various forms and in different ways. All of the materials of the invention are suitable for use in fertilizers and blend well with solid and liquid fertilizers standardly used. They have excellent shelf life and provide good urea-N protection.

19 Claims, No Drawings

STABILIZED UREA FERTILIZER COMPOSITIONS AND METHODS FOR PREPARING SAME

CROSS-REFERENCE TO RELATED APPLICATIONS

This application is the U.S. national stage of PCT/US2019/045546 filed Aug. 7, 2019, and claims priority to U.S. provisional application No. 62/716,252 filed Aug. 8, 2018 and Europe application no. 18195472.8 filed Sep. 19, 2018, all both of which are hereby incorporated herein by reference for all that they each disclose.

FIELD OF THE INVENTION

The present invention relates to stabilized fertilizer compositions and to their processes of making. The present invention also relates to improved urea-nitrogen stabilizer compositions and methods and systems for making these. An effective solid fertilizer is obtained with improved nitrogen stabilization compared to products available on the market. Alternatively, a liquid nitrogen stabilizer composition can be coated onto a solid urea.

BACKGROUND OF THE INVENTION

Urea is a white crystalline solid containing 46% nitrogen, that is widely used in the agricultural industry as a nitrogen fertilizer. World urea consumption is estimated to have exceeded 160 million tons in 2014-2016.

Urea can be applied to the soil as a solid or as an aqueous solution, due to its excellent solubility. In soluble form, it can be used in foliar sprays or in fertigation too. Urea's high nitrogen content (46%) helps reduce handling, storage and transportation costs over other dry nitrogen forms. Urea, when properly applied, results in crop yield increases that are equal to that of other nitrogen fertilizers.

The stability of urea nowadays is receiving greater attention due to a major increase in no-tillage or minimum-tillage crop production. Herein, fertilizer materials are placed on the soil surface, as opposed to placement in the soil for conventional seedbed operations. It is the same in the turf industry, where fertilizer products are placed on the soil and turf surface.

Nitrogen from urea can be lost to the atmosphere if the urea-based fertilizer remains on the soil surface for extended periods of time during warm weather. Urea breakdown can begin as soon as it is applied to the soil. Typically, urea does not break down if the soil is totally dry. However, in the presence of the enzyme urease and a small amount of soil moisture, urea normally hydrolyzes to ammonia and to carbon dioxide. This can occur after 2 to 4 days, and more quickly on high pH soils and at higher temperatures.

Due to this, unprotected urea has a short potency and the fertilizer has a low nitrogen utilization rate. The overall utilization rate of urea nitrogen is only 30 to 35%. Nitrogen loss, volatilization losses, surface runoff and other losses are relatively high. The economic efficiency of this fertilizer is hence low.

For that reason, various forms of protected urea are being offered in the market, amongst which urea granules having a certain amount of N-(n-butyl)-thiophosphoric triamide (NBPT, a urease inhibitor), possibly in combination with some Dicyandiamide (DCD, a nitrification inhibitor). These biochemical inhibitors (urease inhibitors, nitrification inhibitors) have been combined with for instance PASP or salts thereof (e.g. polyaspartic acid sodium salt) into high-tech fertilizer synergists that inhibit the hydrolysis and conversion of urea nitrogen.

Not only does the environment benefit from this, a better nitrogen absorption and utilization by the plants will lead to higher contents of plant proteins, amino acids and fats, etc. Another positive effect is that it will activate and increase the uptake of trace elements that are needed by the plant from the soil. The effective uptake of trace elements required by the crop on its turn, will increase absorption of other nutrients by the crop. If the plant is healthier and robust it will better stand diseases, drought and other unfavorable conditions.

There is a demand for more and better forms of protected urea, both for solid and liquid end uses. There is a demand for additives or adjuvants that enhance the efficiency of liquid N and NS fertilizers. There is a need for a maximum in efficiency at low rates and with less of hazardous products. There is in particular a demand for materials, solid or liquid, that provide the necessary N protection and that at the same time compatible with standard NPK fertilizers. Preferably one herein relies on a combination of different working mechanisms. There is also a demand for combined fertilizers (NS fertilizers) in a pre-mix form, that is end-user friendly and reduces the dosage errors. There is also a demand for fertilizer compositions that can be mixed with urea and which comprise suitable amounts of additives and incorporate relatively high amounts of plant nutrients.

Thiosulfates, polysulfides and (bi)sulfites are well known fertilizers. Many of these products were found to have a urease and/or nitrification inhibitory effect. These fertilizers are offered on the market in the form of a saturated solution in water, which makes the combination with NBPT and/or DCD not straight forward. The latter have very low solubility in water unless combined with some very specific organic solvents like NMP (N-methyl-2-pyrrolidone), DMSO (dimethyl sulfoxide), etc.

The inventors have now found how urea-nitrogen stabilizers can be prepared that contain (1) biochemical inhibitors like NBPT and/or DCD and (2) thiosulfates, polysulfides and/or (bi)sulfites. The latter has the advantage that different working mechanisms are combined. In addition, this allows using less of NBPT and/or DCD.

Another advantage is that carrier-free and solvent-free materials can be made. In other systems, high amounts of organic solvents are often needed that are expensive and/or hazardous to some extents. Solvents with high boiling points like NMP often leave dust and residues plus can destroy thiosulfates when present in high amounts. It was not straight forward that solvent-free materials could be produced. It was not even straight forward that NBPT and/or DCD could be combined with thiosulfates, polysulfides, and (bi)sulfites in a product with excellent shelf life.

SUMMARY OF THE INVENTION

A first aspect of the invention relates to a stabilized fertilizer composition (I) comprising:
  Urea (a),
  One or more compounds (b),
  One or more urease inhibitors (c1) and/or one or more nitrification inhibitors (c2), optionally provided in one or more carriers (d), said compounds (c) being different from compounds (b), and/or
  Optionally one or more additives (e) different from any of the above, and Water (f) in an amount less than about 10 wt % and preferably less than about 5 wt %;

wherein compounds (b) are selected from thiosulfates (b1) and/or polysulfides (b2) and/or (bi)sulfite compounds (b3); and wherein the ratio of urea (a) to compounds (b) is from 1:99 to 99:1, preferably from 2:98 to 98:2. In some embodiments, such as when compound (b) comprises or is ammonium thiosulfate, then this ratio may be from 5:95 to 95:5, from 10:90 to 90:10, from 15:85 to 85:15 or even from 20:80 to 80:20. Another solution is to add some extra iron and/or molybdenum to the ammonium thiosulfate to increase its urease inhibitory effect.

Often the amount of compounds (c) is from about 0.0001 wt % to about 85 wt % at most, preferably to about 55 wt % at most, more preferably to about 50 wt % at most.

Preferably their amount is from about 0.001 wt % to about 50 wt %, more preferably from about 1 wt % to about 40 wt %, even more preferably from about 1 wt % to about 30 wt %, yet even more preferably from about 5 wt % to about 25 wt %, yet even more preferably from about 5 wt % to about 20 wt %.

In a preferred embodiment at least one of NBPT and DCD is present. In a particular embodiment of the invention the compound (c) includes or is NBPT. In another particular embodiment of the invention the compound (c) includes or is DCD.

In a particular embodiment of the invention, the stabilized fertilizer composition (I) comprises NBPT but no DCD. In another embodiment, the stabilized fertilizer composition (I) comprises DCD but no NBPT. In a particular embodiment of the invention both NBPT and DCD are present.

In a particular embodiment of the invention, the amount of NBPT is from about 0.04 wt % to about 1 wt % of NBPT. In another particular embodiment, the amount of NBPT is from about 0.001 wt % to about 0.5 wt % of NBPT. In yet another embodiment, the amount of NBPT is from about 0.01 wt % to about 4 wt % of DCD.

In a particular embodiment of the invention, the stabilized fertilizer composition (I) of the invention comprises from about 90 wt % to about 99 wt % of urea. In another particular embodiment of the invention, the amount of compounds (c) is from about 15 wt % to about 80 wt %, preferably from about 15 wt % to about 55 wt %, more preferably from about 15 wt % to about 50 wt %, even more preferably from about 15 wt % to about 45 wt %, the amount of urea (a) is at most about 10 wt %, and the amount of compounds (b) at most about 10 wt %.

In a particular embodiment of the invention, the stabilized fertilizer composition (I) of the invention comprises at least about 0.5 wt %, preferably at least about 1 wt % of compounds (b).

In a particular embodiment of the invention, the compound (b) includes or is a thiosulfate (b1). In another or the same embodiment, the compound (b) includes or is a polysulfide (b2). In yet another embodiment, the compound (b) includes or is a (bi)sulfite (b3).

Stabilized fertilizer compositions (I) of the invention advantageously are substantially free from organic solvents including having a boiling point above about 150° C. Preferably they are also substantially free from organic solvents including having a boiling point above about 125° C. In a preferred embodiment of the invention substantially no organic solvents are present.

A second aspect of the invention relates to processed to make a stabilized fertilizer composition of the invention. Stabilized fertilizer compositions of the invention can be prepared in various ways. An advantage of the processes of the invention is that they allow the flexibility of using operating temperatures that go from low (at most about 115° C., even lower under vacuum) to minimize product degradation, to high (preferably about 250° C., more preferably about 230° C. max) to optimize energy efficiency and equipment sizing still with low product degradation.

Provided for in the invention is a process for making a stabilized fertilizer composition (II) according to any one of the preceding claims, said process comprising the steps of:
  (i) Providing a mixture of urea (a), of one or more compounds (b) and one or more compounds (c), said mixture containing water (f),
  (ii) Optionally, adding one or more additives (e) as recited,
  (iii) Optionally, adding extra water (f),
  (iv) Obtaining a substantially homogeneous mixture,
  (v) Removing water from this mixture until a product (II) is obtained with a water content of at most about 10 wt %, more preferably at most about 5 wt %;

wherein compounds (b) are selected from thiosulfates (b1) and/or from polysulfides (b2) and/or from (bi)sulfites (b3); and wherein compounds (c) are selected from one or more urease inhibitors (c1) and/or from one or more nitrification inhibitors (c2).

In step (i) compounds (b) can be provided as a solution in water and/or they can be provided in solid form.

It is preferred that the temperature of the mixture containing urea and compounds (b) does not exceed about 250° C., preferably does not exceed about 200° C. In a particular embodiment of the invention, the temperature of the mixture containing urea and compounds (b) does not exceed about 85° C., preferably does not exceed about 80° C.

Often the process of the invention further comprising a granulation step. Other possible additional process steps are listed below.

In a particular embodiment of the invention, the product obtained via a process of the invention is a protected urea granule comprising at least about 90 wt % of urea. Preferred herein are urea granules having a nitrogen (N) content of at least about 40, 41, or 42 wt %.

Depending on how the product is made, compounds (b) and (c) are
  spread substantially homogeneously within a urea granule, or
  present in a coating applied onto a urea granule.

Stabilized fertilizer compositions (I) of the invention have various end uses. They can be used directly as NS fertilizer or they can be blended with other standard NPK fertilizers. Because of a high re-solubility in water they can be used in liquid fertilizers too. A particular embodiment of the invention relates to the use of stabilized fertilizers (I) or (II) according to the invention for adding to a hot urea having a temperature of at least about 130° C., more in particular a urea melt.

DETAILED DESCRIPTION OF THE INVENTION

Throughout the invention unless specified otherwise the following compounds are used as described and in the amounts as specified. Unless specified otherwise, weight percentages (wt %) are always relative to the total weight of the product/composition in question. For compounds (c1), and more in particular NBPT, weight percentages (wt %) are relative to the total amount of urea nitrogen present in the product/composition. For compounds (c2), and more in particular DCD, weight percentages (wt %) are relative to the total amount of urea & ammonium nitrogen present in the product/composition.

Addition of Thiosulfates/Polysulfides/(Bi)Sulfites to Urea and Vice Versa

Urea

Urea-based fertilizer compositions of the present invention can include any suitable urea source. In a broad sense, the urea can comprise (or can consist of) urea itself, urea-formaldehyde, Urea Ammonium Nitrate (UAN), a polymethylene-urea polymer, urea-triazone fertilizers, urea supplemented with elemental sulfur, etc. In one group of embodiments, the urea source is a molten urea. In another group of embodiments, the urea source is a hot melt based on a liquid urea at elevated temperatures (as e.g. used in a drum granulator with spray drying equipment). In yet another group of embodiments, the urea source is a solid form of urea, e.g., a powder, granular or prilled urea. In another group of embodiments, the urea is produced from ammonia and carbon dioxide for example in an industrial urea production plant. Any type of dry urea can be used including but not limited to urea granules, prills, pellets, pastilles, tablets, pearls, powders, crystals, etc.—as all of these urea forms are readily soluble in water. A liquid urea can be used too. The term 'liquid urea' as used herein refers to solutions of urea in water. Liquid urea on the market, in general contains from about 40-60 wt % of urea in water. These liquid urea products are liquid at ambient temperature.

The present invention also provides for particular liquid nitrogen stabilizer compositions (III) and (IV) that can be used to make the stabilized fertilizer compositions of the invention. These liquid nitrogen stabilizer compositions (III) and (IV) of the invention, comprise a given amount of urea-containing compounds (a1) as these protect compounds (b) during drying from thermal and/or oxidative degradation. By an 'urea-containing compound' is meant herein a compound that contains a certain amount of free urea or a defined urea-derivative. Examples thereof are urea itself (a1, $CH_4N_2O$, MW around 60) and/or to urea-aldehyde products (a2) and/or to urea-triazone compounds (a3). Preferred in the context of the invention is urea ($CH_4N_2O$, MW around 60).

Preferably a 'urea' is used with a purity of at least about 50%, preferably at least about 70%, more preferably at least about 90% and most preferably at least about 95%. Preferably, the urea has a purity of at least about 99, 99.1, 99.2, 99.3, 99.4, 99.5, 99.6 or up to about 99.7%. Dry urea can have up to about 1 wt % Biuret.

Compounds b and b'

Compounds (b) in the context of the invention can be thiosulfates and/or polysulfides and/or (bi)sulfites. In an embodiment of the invention, compounds (b) include or are (bi)sulfites and/or polysulfides. In another embodiment of the invention, compounds (b) include or are thiosulfates and/or polysulfides. Most preferred are compounds that include or are thiosulfates. Compounds (b) are usually provided as solutions or dispersions in water. The latter are herein referred to as compounds (b').

Thiosulfates

Thiosulfates are typically provided in the market as liquid thiosulfates (b1') containing the active compound (b1) in water. In the invention, thiosulfate solutions are preferably used at their maximum concentrations. The thiosulfates in thiosulfate solutions are in general salts of alkali metals, alkali earth metals, and transition metals such as zinc, iron, and copper. Preferred in the invention are ammonium thiosulfates and/or potassium thiosulfates and/or calcium thiosulfates and/or magnesium thiosulfates and/or manganese thiosulfates and/or iron thiosulfates. Preferred for use in the invention are ammonium thiosulfates and/or potassium thiosulfates and/or calcium thiosulfates and/or magnesium thiosulfates. More preferred are ammonium thiosulfates and/or magnesium thiosulfates and/or calcium thiosulfates. Magnesium thiosulfates and/or calcium thiosulfates have the strongest urease inhibitory effect. Thus, most preferred are magnesium thiosulfates and/or calcium thiosulfates. Potassium thiosulfate can be used too, although is somewhat less preferred. Ammonium thiosulfate can be used too but preferably together with some extra iron and/or molybdenum to increase its efficiency.

Thiosulfate based liquid fertilizers (b1') are well known, and comprise for example:
- Potassium thiosulfate, which is a 50% aqueous solution (grade 0-0-25-17S).
- Magnesium thiosulfate, which is a 5-25% aqueous solution (grade 0-0-0-10S-4Mg)
- Calcium thiosulfate, which is a 5-25% aqueous solution (grade 0-0-0-10S-6Ca)
- Ammonium thiosulfate, which is a 50-60% aqueous solution (grade 12-0-0-26S).

Polysulfides

Also polysulfides are typically provided in the market as liquid polysulfides (b2') containing the active compound (b2) in water. Also polysulfide solutions are preferably used at their maximum concentrations. Polysulfides (b2) are preferably chosen from calcium polysulfides and/or potassium polysulfides and/or sodium polysulfides and/or iron polysulfides. Preferred are calcium polysulfides and/or potassium polysulfides and/or ammonium polysulfides. Particularly preferred are calcium polysulfides and/or potassium polysulfides because of their good urease inhibiting effect.

(Bi)sulfites

Also (bi)sulfites are typically provided in the market as liquid (bi)sulfites (b3') containing the active compound (b3) in water. By the term '(bi)sulfite' is meant to designate sulfites, bisulfites and mixtures of both. Also (bi)sulfite liquid solutions are preferably used as their maximum concentration. Examples of compounds (b3) that can be used in the context of the invention are potassium sulfite, potassium bisulfite, ammonium sulfite and/or ammonium bisulfite and/or iron sulfite and/or iron bisulfite. Preferred are potassium sulfite, potassium bisulfite, ammonium sulfite and/or ammonium bisulfite. More preferred are potassium sulfite and/or potassium bisulfite.

In an embodiment of the invention, compounds (b) include or are selected from thiosulfates (b1). In another embodiment of the invention, compounds (b) include or are selected from polysulfides (b2). In another embodiment of the invention, compounds (b) include or are selected from (bi)sulfites (b3). Mixture of any of these can also be used. In a particular embodiment of the invention, at least two compounds (b) are present.

Biochemical Nitrogen Stabilizers

Urease Inhibitors (c1)

The term 'urease inhibitor' as used herein refers to a compound that reduces, inhibits, or otherwise slows down the conversion of urea to ammonium ($NH_4^+$) in soil when the compound is present, as opposed to the conversion of urea to ammonium ($NH_4^+$) in soil when the compound is not present, but conditions are otherwise similar. Non-limiting examples of urease inhibitors include thiophosphoric triamide compounds disclosed in U.S. Pat. No. 4,530,714. In other embodiments, the urease inhibitor is a phosphorous triamide having the formula:

$$X=P(NH_2)_2NR^1R^2$$

wherein X is oxygen or sulfur; and $R^1$ and $R^2$ are each a member independently selected from the group consisting of hydrogen, C1-C12 alkyl, C3-C12 cycloalkyl, C6-C14 aryl, C2-C12 alkenyl, C2-C12 alkynyl, C5-C14 heteroaryl, C1-C14 heteroalkyl, C2-C14 heteroalkenyl, C2-C14 heteroalkynyl, or C3-C12 cycloheteroalkyl.

Illustrative urease inhibitors can include, but are not limited to, N-(n-butyl)thiophosphoric triamide (NBPT), N-(n-butyl)phosphoric triamide, thiophosphoryl triamide, phenyl phosphorodiamidate, cyclohexyl phosphoric triamide, cyclohexyl thiophosphoric triamide, phosphoric triamide, hydroxyurea, α-hydroxyketone, triketone oximes, hydroquinone, p-benzoquinone, hexamidocyclotriphosphazene, thiopyridines, thiopyrimidines, thiopyridine-N-oxides, N,N-dihalo-2-imidazolidinone, N-halo-2-oxazolidinone, nitrapyrin, 3, 4-dimethylpyrazolphosphate (DMPP), derivatives thereof, or any combination thereof. Other examples of urease inhibitors include phenylphosphorodiamidate (PPD/PPDA), N-(2-nitrophenyl) phosphoric acid triamide (2-NPT), ammonium thiosulphate (ATS) and organo-phosphorous analogs of urea are effective inhibitors of urease activity (see, e.g., Kiss and Simihaian, Improving Efficiency of Urea Fertilizers by Inhibition of Soil Urease Activity. Kluwer Academic Publishers, Dordrecht, The Netherlands, 2002; Watson, Urease inhibitors. IFA International Workshop on Enhanced-Efficiency Fertilizers, Frankfurt. International Fertilizer Industry Association, Paris, France 2005). Recently KOCH has been launching DUROMIDE™ technology based on new powerful urease inhibitors like ANVOL.

Particularly suitable are hydroxyurea, α-hydroxyketone, triketone oximes, hydroquinone (HQ), nitrapyrin, 3, 4-dimethylpyrazolphosphate and/or phosphoric triamide type inhibitors. Preferred are phosphoric triamide type inhibitors, in particular thiophosphoric triamides, and more in particular aliphatic thiophosphoric triamides.

Particularly preferred are N-alkyl and/or N-acyl thiophosphoric triamides. Examples thereof are N-(n-Propyl)-thiophosphoric triamid (NPPT) and/or N-(n-butyl)-thiophosphoric triamide (NBPT).

NBPT is commercially available under the trademark Agrotain® available from Agrotain International, St. Louis, Mo. (Koch). It is available in solid and various liquid forms (with different types of solvents).

In the invention, the choice of urease inhibitor to use depends on the type of compounds (b) and from compounds (c2) that may be present. In the invention, compounds (c1) are different from compounds (b) and different from compounds (c2) that may be present.

In a particularly preferred embodiment, the compound (c1) includes or is NBPT.

In the context of the invention, solid NBPT can be directly added to molten urea. Another possibility is that NBPT is part of a nitrogen stabilizing composition (solid or liquid). In a particular embodiment of the invention, NBPT is part of an aqueous nitrogen stabilizing composition (like compositions III and IV of the invention).

The term 'urease inhibitor' as used in the invention is meant to include any impurities that can be present in the urease inhibitor (in particular NBPT). A typical impurity found in NBPT is for instance $PO(NH_2)_3$ which can catalyze the decomposition of NBPT under aqueous conditions. For that reason it is preferred to use urease inhibitors (in particular NBPT) in sufficiently pure form. Urease inhibitors used in the invention (in particular NBPT) preferably are at least about 80, 81, 82, 83, 84, 85, 86, 87, 88, 89, 90, 91, 92, 93, 94, 95, 96, 97, 98, 99, 99.1, 99.2, 99.3, 99.4, 99.5, 99.5, 99.6, 99.7, 99.8, or even 99.9% pure. Preferably the amount of biuret present is at most about 1 wt %.

In one group of embodiments, the amount of the urease inhibitors in the stabilized fertilizer compositions (I) and (II) of the invention is at least about 0.0001, 0.001, 0.002, 0.003, 0.004, 0.005, 0.006, 0.007, 0.008, or 0.009, or at least about 0.01 wt %. In another group of embodiments, this amount is at least about 0.02, 0.03, 0.04, 0.05, 0.06, 0.07, 0.08, or 0.09, or at least about 0.1 wt %. In yet another group of embodiments, this amount is at least about 0.13, 0.14, 0.15, 0.16, 0.17, 0.18, or 0.19, at least about or 0.2 wt %. In a particular embodiment of the invention, this amount is at least about 1, 2, 3, 4, 5, 6, 7, 8, 9, 10, 11, 12, 13, 14 or 15 wt %.

Urease inhibitors (c1) are generally present in an amount from about 0.001 wt % to about 85 wt %. Preferably this amount is at most about 80, 75, 70, 60 or 50 wt %. Usually this amount is at least about 0.01, 0.02, 0.03, 0.04 wt %. Usually this amount is at most about 40, 39, 38, 37, 36 wt %, and most often is at most about 35, 34, 33, 32, 31 or 30 wt %. A preferred urease inhibitor is NBPT. A person skilled in the art will know how to adapt the amounts of NBPT in function of the way the solid products of the invention are made and used in the field, so that the quantity of NBPT added is about 900 mg/kg urea.

In one particular embodiment, NBPT is present in an amount from about 0.001 to about 1.5 wt %, preferably from about 0.01 to about 1 wt %. In one embodiment, the present invention provides for a stabilized fertilizer composition, wherein urea is present in the amount between about 90 wt % to about 99 wt %. The concentration of NBPT in urea granules is generally from about 0.04 to about 0.1 wt %. When present in outer layers only, then this amount may be at most about 0.5, 0.4, 0.3 or 0.2 wt %, even at most about 0.1, 0.09, 0.08, 0.07 or 0.06 wt %. The minimal amount is then often about 0.0001 wt %, preferably about 0.02, 0.03 or 0.04 wt %. Higher amounts can be present, for instance in carrier materials for compounds (c1). These materials can contain from about 0.1 to about 85, 80, 75, 70, 65, 60, or 55, and preferably to about 50, 45, 40, 39, 38, 36, 37, 35, 34, 33, 32, 31 or 30 wt % of NBPT. NBPT is herein preferably present in an amount of at least about 1, 1, 5, 2, 2.5, 3, 3.5, 4, 4.5 or 5 wt %, preferably at least about 10 wt %, and more preferably at least about 15 wt %, even at least about 20 wt %.

Nitrification Inhibitors (c2)

'Nitrification inhibitors' are compounds which inhibit the conversion of ammonium to nitrate and thus, also reduce nitrogen losses in the soil. Examples of nitrification inhibitors include, but are not limited to, dicyandiamide (DCD), 2-chloro-6-trichloromethylpyridine (nitrapyrin), 3,4-dimethylpyrazole phosphate (DMPP), 3-methylpyrazole (MP), 1-H-1,2,4-triazole (TZ), 3-methylpyrazole-1-carboxamide (CMP), 4-amino-1,2,4-triazole (AT, ATC); 3-amino-1,2,4-triazole; 2-cyanimino-4-hydroxy-6-methylpyrimidine (CP); 2-ethylpyridine; ammonium dithiocarbamate (ADTC), ammonium thiosulfate (ATS); sodium thiosulfate (ST); thiophosphoryl triamide; thiourea (TU); guanylthiourea (GTU); ammonium polycarboxilate; ethylene urea; hydroquinone; phenylacetylene; phenylphosphoro diamidate; neemcake; calcium carbide; 5-ethoxy-3-trichloronnethyl-1,2,4-thiadiazol (etridiazol; terraole); 2-chloro-6-(trichloromethyl)-pyridine (N-Serve), 2-amino-4-chloro-6-methylpyrimidine (AM); 1-mercapto-1,2,4-triazole (MT); 2-mercaptobenzothiazole (MBT); 3-mercapto-benzothiazole (MBT); 2-sulfanilamidothiazole (ST); 4-amino-1,2,I,triazole, 3-mercapto-1,2,4-triazole; 5-amino-1,2,4-thiadiazole; 2,4-diamino-6-trichloromethyl-s-triazine (CL-1580); N-2,5-dichlorophenyl succinanilic acid (DCS); nitroaniline, and chloroaniline.

Particularly suitable are dicyandiamide, 3,4-dimethylpyrazzole phosphate, 2-chloro-6-(trichloromethyl)-pyridine (N-Serve), Thiourea (TU), 2-sulfanilamidothiazole, 4-amino-1,2,I,triazole, 3-mercapto-1,2,4-triazole, ammonium dithiocarbamate, ammonium thiosulfate and/or 3-mercapto-benzothiazole. Preferred herein are DCD, ATS, TU and/or DMPP, more preferred are DCD, ATS and/or DMPP, and most preferred is DCD due to its efficacy, besides it availability and environmental safety. In a particular embodiment of the invention the nitrification inhibitor present in the additive solution is DCD, used alone or in combination with one or more other nitrification inhibitors.

In the invention, the choice of the nitrification inhibitor to use depends on the type of compounds (b) and of compounds (c2) that may be present. In the invention, compounds (c1) are different from compounds (b) and different from compounds (c1) that may be present.

In a particularly preferred embodiment, the compound (c2) includes or is DCD.

In the context of the invention, solid DCD can be directly added to molten urea. Another possibility is that DCD is part of a nitrogen stabilizing composition (solid or liquid). In a particular embodiment of the invention, DCD is part of an aqueous nitrogen stabilizing composition (like compositions III and IV of the invention).

The term 'nitrification inhibitor' as used in the invention is meant to include any impurities that can be present in the nitrification inhibitor (in particular DCD).

For that reason it is preferred to use urease inhibitors (in particular DCD) in sufficiently pure form. Nitrification inhibitors used in the invention (in particular DCD) preferably are at least about 80, 81, 82, 83, 84, 85, 86, 87, 88, 89, 90, 91, 92, 93, 94, 95, 96, 97, 98, 99, 99.1, 99.2, 99.3, 99.4, 99.5, 99.5, 99.6, 99.7, 99.8, or even 99.9% pure.

Nitrification inhibitors (c2) are generally present in an amount from about 0.001 wt % to about 85 wt %. Preferably this amount is at most about 80, 75, 70, 60 or 50 wt %. In one group of embodiments, the amount of the nitrification inhibitor in the stabilized fertilizer compositions (I) and (II) of the invention is at least about 0.01, 0.02, 0.03, 0.04, 0.05, 0.06, 0.07, 0.08, or 0.09, or at least about 0.1 wt %. In another group of embodiments, this amount is at least about 0.2, 0.3, 0.4, 0.5, 0.6, 0.7, 0.75, 0.8, 0.85, 0.9, or 0.95 or at least about 1 wt %.

In an embodiment of the invention, the amount of compounds (c2) is from about 0.01 to about 4 wt %, more preferably from about 0.1 to about 3 wt %. In a particular embodiment of the invention, the amount of the nitrification inhibitors in the stabilized fertilizer compositions (I) and (II) of the invention is between about 0.1 and about 2.2 wt %.

In some embodiments, this amount is between about 0.2 and about 1.2 wt %. When present in outer layers only, then this amount may be lower. In carrier materials for compounds (c2) these amounts can be higher. These materials often contain from about 0.5 to about 85, 80, 75, 70, 65, 60, or 55, and preferably to about 50, 45, 40, 39, 38, 36, 37, 35, 34, 33, 32, 31 or 30 wt % of NBPT. NBPT is herein preferably present in an amount of at least about 1, 1, 5, 2, 2.5, 3, 3.5, 4, 4.5 or 5 wt %, preferably at least about 10 wt %, and more preferably at least about 15 wt %, still more preferably at least about 20 wt %.

In some aspects, the stabilized fertilizer compositions of the invention comprises a nitrification inhibitor in an amount between about 0.75 wt % and about 0.95 wt %. In one embodiment, the present invention provides for a stabilized fertilizer composition wherein urea is present in the amount between about 90 wt % to about 99 wt %. In one group of embodiments, the amount of the urease inhibitors in the stabilized fertilizer compositions (I) and (II) of the invention is at most about 40, 39, 38, 37, 36, 35, 34, 33, 32, or 31, or at most about 30 wt %. In another group of embodiments, this amount is at most about 29, 28, 27, or 26, or at most about 25 wt %. In a particular embodiment of the invention, this amount is at most about 24, 23, 22, or 21 or at most about 20 wt %.

In an embodiment of the invention, a urease inhibitor (c1) is used that includes or is NBPT. In another embodiment of the invention, a nitrification inhibitor (c2) is used that includes or is DCD. In yet another embodiment of the invention, both a urease inhibitor (c1) and a nitrification inhibitor (c2) are being used. In a particular embodiment of the invention, both NBPT and DCD are present.

The use of two specific additives, one to inhibit the urease-catalyzed hydrolysis of urea and the other to inhibit the nitrification of ammonia, in the fertilizer composition of this invention offers an opportunity to tailor the make-up of the composition to match the nitrogen nutrient demand of a given crop/soil/weather scenario.

An advantage of the invention is that, since compounds (b) can exert inhibitory effects too, that the stabilized fertilizer compositions (I) and (II) of the invention require less of the conventional inhibitors like NBPT and/or DCDC. Or a better effect can be obtained by using the same amount of such inhibitors.

In general, the total amount of compounds (c1) and/or (c2) is at most about 85, 80, 75, 70, 65, 60, or 55 wt %. Most often this amount as at most about 50, 45, 40, 35, 30 or even 25 wt %. In a particular embodiment of the invention though, compounds (c) are present in an amount of from about 15 wt % to about 50 wt %, from about 15 wt % to about 45 wt %, and more preferably from about 20 wt % to about 40 wt %.

In a particular embodiment of the invention, compounds (c1) and/or (c2) are present in an amount from about 0.01 wt %, preferably 0.1 wt % to about 20 wt %.

Compounds (d)

In one group of embodiments, the present invention provides for stabilized fertilizer compositions (I) and (II) containing no carrier material (d). By a 'carrier materiel' is meant in the present invention in which the urease inhibitor and/or urease inhibitor is dissolved. Such carriers (liquid or solid, most often liquid) are otherwise standard in the art for providing NBPT (and/or DCD). By a 'carrier' as used in the context of the invention is meant a solvent/material in which NBPT and/or DCD dissolves. In the context of the invention, this carrier is a material that is different from a compound (a) as defined herein.

When adding NBPT (and/or DCD) to a urea melt, then often organic solvents with a boiling point higher than about 125° C., preferably higher than about 150° C. are used.

Examples of solvents with a boiling point higher than 125° C. include certain alcohols, diesters of a dicarboxylic acid, alkyl carbonates and/or cyclic carbonate ester esters. Examples of possible alcohols are alkanols, alkenols, hydroxyalkyl aryl compounds, glycols, glycol ethers, glycol esters, poly(alkylene glycols), poly(alkylene glycol) ethers, poly(alkylene glycol) esters, esters of a hydroxyacid and/or hydroxylalkyl heterocycles. Examples of suitable glycols include ethylene glycol, propylene glycol, 1,4-butanediol, 1,2-pentanediol, 1,3-hexanediol and the like. Suitable alkanolamines include ethanolamine, diethanolamine, triethanolamine, monoisopropanolamine, diisopropanolamine, 2-aminoethanol, 2- or 3-aminopropanol, 1-amino-2-propanol, 2- or 3-aminobutanol, 2-, 3-, or 4-aminopentanol, 2-, 3-, or 4-amino-2-methylbutanol, 3-aminopropylene glycol and the like. Suitable glycol ethers include methyl, ethyl, butyl, isopropyl, or tert-butyl ethers.

Examples of solvents with a boiling point of about 150° C. and higher include but are not limited to amide solvents like formamide, N,N-dimethyl formamide, N,N-dimethyl acetamide and/or N-butyl N-phenyl acetamide. Examples of N-alkyl 2-pyrrolidone amide solvents include N-methyl 2-pyrrolidone (i.e., NMP), N-octyl 2-pyrrolidone and/or N-dodecyl 2-pyrrolidone. The above are examples of protic solvents that have been used. DMSO (dimethyl sulfoxide) is another example of a solvent with a boiling point higher than about 150° C. DMSO is an example of an aprotic solvent that is used in the art to dissolve NBPT and/or DCD.

Such solvents are often expensive and/or hazardous to some extent. Because of the presence of urea, which proved to be an excellent solvent for both compounds (b) and (c) of the invention, less of the above solvents are needed though. And if any solvents are used at all then other solvents can be used like ethanol and/or N-SURE® (a urea-triazone fertilizer).

It is an advantage of the invention that the use of noxious compounds like NMP can be avoided. In a preferred embodiment of the invention, the stabilized fertilizer compositions (I) and (II) of the invention are substantially free from solvents having a boiling point higher than about 150° C. By 'substantially free from X' is meant herein that either no X can be detected, or that the amount of X is lower than about 1 wt %, preferably is lower than about 0.5 wt %, more preferably is lower than about 0.1 wt %. In a preferred embodiment stabilized fertilizer compositions (I) and (II) are substantially free from solvents having a boiling point higher than about 125° C. In a particular embodiment the fertilizer compositions (I) and (II) of the invention are substantially free from liquid 'carrier materials' as mentioned above.

In some aspects, the carrier for NBPT and/or DCD is a solid carrier. Non-limiting examples of solid carriers include diatomaceous earth, ionic salts (including but not limited to inorganic salts or organic salts, including but not limited to ammonium salts), a urea-formaldehyde polymer (UFP), urea, a grain flour, a clay, or elemental sulfur. Due to the presence of urea, in the present invention, also the amount of solid carrier materials for NBPT and/or DCD can be limited. In a particular embodiment of the invention, the fertilizer compositions (I) and (II) are substantially free from solid carrier materials other than urea and/or urea-aldehyde adducts and/or urea-triazone fertilizers (like N-SURE®). In a preferred embodiment of the invention, no carrier material is used at all, meaning that NBPT and/or DCD are added directly in solid form.

Compounds (e)

Apart from the above, fertilizer compositions (I) or (II) of the invention can also comprise one or more additives (f) like dyes, colorants, odor masking agents, flow aids, processing aids (such as, for example, a granulating binder), conditioning agents (such as, for example, mineral oil), anti-caking agents (such as, for example, gypsum, silicon dioxide, kaolinite and/or PVA), hardening agents (such as, for example, UF 85), surfactants, silicas, thickeners, viscosity modifiers, pH control agents, buffers, copper, molybdenum, elemental sulfur, additives to lower the urea melt temperature, bactericides, etc. Compounds (e) in the invention are different from any of compounds (a), (b), (c), (d) and (f).

Dyes, when present, are generally present in an amount less than about 3 wt %, preferably less than about 2 wt %, more preferably less than about 1 wt %. Hardeners like UF 85, when present, are generally present in an amount up to 0.5 wt %, preferably up to about 0.4 wt %, more preferably up to about 0.3 wt %.

The optional compounds (e) can be mixed with a nitrogen stabilizer composition (III) or (IV) of the invention, and they can added to the molten urea simultaneously, or they can be separately added, previous to, simultaneously with or subsequent to adding a nitrogen stabilizer composition (III) or (IV). The nitrogen stabilizing composition can be an aqueous composition that comprises one or more compounds (b) and/or an aqueous composition that comprises one or more compounds (b), as well as one more compounds (c1) and/or (c2). Preferably the nitrogen stabilizing composition and/or further comprises one or more of: urea (a1), a urea-aldehyde product (a2) and/or a urea-triazone fertilizer (a3). The latter are referred as liquid nitrogen stabilizers (IV). The nitrogen stabilizing composition (IV) of the invention can also consist of a solid fertilizer composition (I) or (II) of the invention that is added to a urea melt in the form of a solid material.

Processes for Making Stabilized Fertilizer Compositions (I) and (II) of the Invention Processes for making a stabilized fertilizer composition (II) according to the invention comprise at least the steps of:
 (i) Providing a mixture of urea (a), of one or more compounds (b) and one or more compounds (c), said mixture containing water (f),
 (ii) Optionally, adding one or additives (e) as recited,
 (iii) Optionally, adding extra water (f),
 (iv) Obtaining a substantially homogeneous mixture,
 (v) Removing water from this mixture until a product (II) is obtained with a water content of at most about 10 wt %, more preferably at most about 5 wt %;

wherein compounds (b) are selected from thiosulfates (b1) and/or from polysulfides (b2) and/or from (bi)sulfites (b3); and wherein compounds (c) are selected from one or more urease inhibitors (c1) and/or from one or more nitrification inhibitors (c2).

Processes of the invention often further contain one or more of the following additional steps: a breaking step, a grinding step, a granulation step, a sieving step, a final drying step, a polishing step, a cooling step and/or a packaging step.

In a particular embodiment, an aqueous composition (A) is provided from which water is then removed by evaporation, all then not under vacuum. This aqueous composition comprises at least one urea-containing compound (a) as recited, at least one compound (b) as recited and possibly also one or more compounds (c1) and/or (c2) if freshly made. By applying a vacuum to this aqueous solution (A), temperatures can be kept below about 100° C., which is beneficial for product stability, below about 95° C., below about 90, 89, 88, 87, 86° C., below about 85, 84, 83, 82, or 81° C., even below about 80° C. If no vacuum is applied, then temperatures of at most about 130° C., at most about 120° C., even at most about 115, 114, 113, 112, 110 or 110° C. suffice to obtain a solid particulate product. Even at these temperatures products with excellent shelf life were obtained. The higher temperatures did not lead to substantial discoloration and/or degradation of the compounds (b). Often the solids remaining after evaporation, were further dried at ambient temperature to remove last bits of water. If needed then the particulate products obtained can be crushed and/or sieved to obtain granulates of a particular size. The urea containing-compound (a) and in particular urea was found to protect compounds (b) from thermal and/or oxidative degradation. It is expected that they may also protect other temperature sensitive compounds like for instance NBPT from such degradation.

In one embodiment of the invention, stabilized fertilizer compositions (I) and (II) of the invention are made from solid urea, a solid form of a nitrification inhibitor, a solid form of a urease inhibitor or combinations thereof. In another particular embodiment of the invention, stabilized fertilizer compositions (I) and (II) of the invention are made from liquid compounds (b), from solid and/or liquid urea, and from a solid form of a urease inhibitor and/or a nitrification inhibitor. In a specific embodiment of the invention, stabilized fertilizer compositions (I) and (II) are made by adding an aqueous composition (A) to molten urea that comprises one or more compounds (b), and further a solid urea and/or a liquid urea. The aqueous composition (A) can also comprise a solid urease inhibitor and/or a solid nitrification inhibitor. In a specific embodiment of the invention, the aqueous composition (A) of the invention can contain high amounts of urease inhibitors and/or nitrification inhibitors. Alternatively, the urease inhibitors and/or nitrification inhibitors, or part of these, can be added at other suitable moments to the molten urea, wherein the moment of adding may be adapted in accordance with the nature of the compounds added.

In a particular embodiment of the invention, stabilized fertilizer compositions of the invention are made by adding a solid composition (I) and (II) as described herein to a molten urea.

Direct addition of these aqueous compositions (A) to a hot urea melt is less preferred. Said process, in big lines contains the steps of a) forming molten urea; b) adding to said molten urea an aqueous composition (A); and c) cooling the molten urea-nitrogen stabilizer composition to form a solid stabilized fertilizer composition of the invention. Preferably, the aqueous composition (A) is partially or fully dried before addition to a hot urea melt. In one embodiment of the invention, compounds (b) and (c) are provided separately. When using compounds (b') for feeding to a urea melt, then again the water present is preferably at least partially removed before adding these compounds to the urea melt. In a particular embodiment of the invention, stabilized fertilizer compositions of the invention are made by adding a solid composition (I) and (II) as described herein to a molten urea.

Compounds (c1) and/or (c2) can be added together with compounds (b) but preferably they are fed to the urea melt separately. This to keep a certain flexibility qua amounts but also because they may require a particular and distinct way of feeding. NBPT and DCD for instance have different behaviors and different melting points.

Urease inhibitors (c1), such as NBPT, preferably are incorporated into molten urea by adding them in a solid form, directly without a carrier. Another possibility is to add NBPT in the form of a melt. The use of melts comprising urease inhibitors (c1) is described in WO 2017/125383. Preferably this NBPT melt, that optionally also can contain small amounts of DCD, is kept at a temperature T1 that is maximally about 25° C. above the melting temperature of the urease inhibitors (c1), in casu NBPT. Usually this temperature T1 is from about 5' to about 25° C., preferably from about 10° C. to about 25° C., more preferably from about 10° C. to about 20° C. above the respective melting temperatures. For NBPT this would mean that T1 is between 60° C. and 80° C., preferably between about 65° C. and about 80° C., more preferably between about 65° C. and about 75° C.

Possible but less preferred is to add to the urea melt a concentrated mixture of urease inhibitors with a suitable carrier as described above (see compounds e). Preferably urease inhibitors (c1), such as NBPT, are then added close to the granulation step, to limit the retention time. Alternatively, the temperature of the urea melt can be kept low, possibly by adding compounds that lower the urea melt temperatures. Examples of such additives are formaldehyde containing compounds, in particular urea-formaldehyde polymers or condensates like UF8. That way it is possible to keep the urea melt temperature between about 110° C. and about 160° C., between about 120° C. and about 140° C., more specifically between about 130° C. and about 135° C. (see WO 2017/125383). This way the degradation of urease inhibitors such as NBPT can be better controlled and reduced to the maximum. The term 'granulation' is not to be interpreted in a restrictive manner, and can include a prilling process, a pelleting process, a compounding process, a fluidized bed granulation, drum granulation, a falling curtain granulation, sprouted bed granulation, an agglomeration granulation, a spherodizer process, spray drying and compacting, vortex granulation or other suitable granulation processes or means used in the art to form solid fertilizer particulates like granules, prills, pellets, tablets, etc. Examples of a suitable granulation apparatus like e.g. a falling curtain granulation apparatus, agglomeration granulation apparatus, a drum granulation apparatus, etc. The granulation apparatus may be a drum granulation apparatus.

Nitrification inhibitors (c2), such as DCD, can also be added and blended with the molten urea before its granulation. Several methods can be used for the introduction of nitrification inhibitor into the molten urea. If available as a powder or in granular form, the nitrification inhibitor can be fed into a stream of molten urea using a conventional solids feeding device. Alternatively, the nitrification inhibitor may be dissolved in a relatively small quantity of molten urea, as for example in a side stream of molten urea in a urea plant, to form a concentrated nitrification inhibitor solution in molten urea that is then metered into the main stream of the molten urea. In yet another embodiment, the nitrification inhibitor may be incorporated into a concentrated nitrogen inhibitor solution (III) or (IV) or into an aqueous composition (A) as described herein.

The order in which urease inhibitors (c1) and/or nitrification inhibitors (c2) are added to the molten urea in some aspects is flexible. Compounds (c1) and (c2) may thus be added at the same moment, simultaneously, or at a different moment depending on the equipment available.

Either urease inhibitor or nitrification inhibitor may be introduced first, or both of these components may be added simultaneously. A convenient point for the addition of nitrification inhibitors to molten urea in a urea production plant would be before or between the evaporation steps used to reduce the water content of the molten urea. A concentrated urease inhibitor carrier, however, is in certain aspects introduced into the molten urea just before the granulation or prilling step with only sufficient retention time in the melt to allow for distribution of the urease inhibitor in the melt.

In general short retention times are preferred for temperature sensitive compounds. In said case, the time between adding the compounds and passing to granulation is less than about 60, 50, 40, or 30 minutes, preferably less than about 25, 20, or 15 minutes, most preferably less than about 15, 10 or 5 minutes. More preferred are even shorter retention times. Preferably the time between adding and mixing compounds (b) and (c1) and granulation is at most about 60, 55, 50, 45, 40, or 35 seconds, preferably at most about 30, 25, or 20 seconds, most preferably at most about 15 seconds.

Independent of the time of adding the various compounds adding compounds (b), (c), optionally (e) etc., it is generally important to foresee a sufficient mixing during the different steps of adding compounds (b), (c), optionally (e) etc. to assure a homogeneous distribution of the compounds throughout the molten urea before the melt cools and solidifies in the subsequent granulation step. For said purpose, an in-line mixing, spiro-agitation, or combinations thereof may be used.

The homogeneous distribution of compounds (b) and of compounds (c1) and/or (c2) in the stabilized fertilizer compositions (I) and (II) of the invention may enhance the performance of these compositions in terms of their ability to promote plant growth.

After cooling, the methods of the invention generally comprises a granulation step. This step may be preceded by steps of compacting, crushing, grounding, milling, etc. The use of a granulation binder may lead to a more homogeneous product.

The cooling may take place in a granulation apparatus, a prilling apparatus, a pelletizing apparatus, a compounding apparatus, or the like. Examples of suitable granulation apparatuses are given above.

After cooling the solid stabilized fertilizer compositions (I) and (II) of the invention can take a variety of solid forms depending on how the mixture is cooled and/or further processed. Examples of solid forms include but are not limited to a granule, a prill, a pellet, a pastille, or other type of compounded form. Granules and prills are most common.

The above shows that there are various ways to introduce compounds (b) and (c) into a molten urea of an otherwise standard urea production process. The urea production process can be a continuous process. Alternatively, it may be a batch process too. An advantage of materials and methods of the invention is that no specific equipment is needed. A standard urea production process make use of a mixing equipment, a urea synthesizing unit, a tank to hold the molten urea, one or more feeder lines, a water evaporation unit and a cooling unit. In a particular embodiment, there is a further mixing apparatus between the urea synthesizer unit and the cooling apparatus, for adding e.g. urease inhibitors (c1). In said case, the distance between said mixing apparatus and said cooling apparatus is sufficient to provide uniform mixing and to minimize decomposition of added compounds. Also a flow control system coupled to feeding apparatus, the urea synthesizing unit, and/or the water evaporating unit is preferably present. Preferably said flow control system comprises a flow meter and a variable speed pump. Preferably the systems present allow to monitor the amount of water in the molten urea and/or the amount of nitrogen stabilizers present in the molten urea. Preferably there are also some means present to control the temperature of the molten urea having nitrogen stabilizers added. Preferably one or more holding or storage tanks are present too, with means allowing to hold the materials contained therein at a given temperature and with means to control the dosage rate. Such holding or storage tanks may be used to keep e.g. urease inhibitors (c1) and/or aqueous compositions (A) under controlled conditions.

In a particular embodiment, there is also a prilling tower present. Prills have the advantage that they can be made more economically than granules. Granules can be produced by any standard technique available. Granulation offers the advantages of having a larger particle size, a higher degree of sphericity, a higher crush and/or impact strength, and hence, storability. Nucleating or seed particles may be used to trigger formation of the granular composition. The granulator may include a scrubbing unit to capture dust from the granulation process before its release. The granulator may further include a recycling unit to capture unused reactants (or side products) for re-use or conversion into reusable products. The granules exiting the granulation apparatus may for instance be sized. Undersized particles may be cooled and recycled, while the oversized particles may be cooled, ground, and then recycled into the granule forming apparatus. One or more sieves may be present to help control the particle size. Granules produced may be coated before or after sizing. The coating that is being applied can be an inert material, designed to delay or to control release of the granule's active ingredients. Alternatively, the coating is itself a fertilizer. The coating may include multiple layers, some of which may be inert. A coating that provides anti-caking and/or moisture repellent properties can help improve shelf life. Examples of suitable anticaking and/or moisture repellent coatings are vegetable oil (rapeseed or neem), paraffin and Novoflow anti-caking and/or moisture repellence agent s (Novochem Fertilizer Additives, The Netherlands).

Depending on the form, a urea granule or prill according to the invention can have particle sizes depending on how the composition is cooled. In one embodiment, urea granules have a particle size of from about 0.84 to about 4.76 millimeters.

In another embodiment of the invention there is no granulation step and stabilized fertilizer compositions (I) and (II) of the invention are provided in the form of a powder or possibly in the form of a hydrate or crystals.

When added to a urea melt prior to granulation, then compounds (b), (c) and where present (e) are spread substantially homogeneously within the solid particulate being produced. Preferred is to have at least compounds (b) spread substantially homogeneously within the solid particulate being produced.

When added during granulation, for instance in the prilling tower, then compounds (b), (c) and where present (e) will be present primarily in the outer layers solid particulate being produced. This allows to use lower amounts of compounds (b) and (c). For instance, the amount of compounds (c1) like NBPT will then be less than about 0.5, 0.4, 0.3, or even 0.2 wt %. There exist alternative ways to provide compounds (b) and (c) in the form of a coating around urea granules or prills.

Provided is hence also a process for making stabilized fertilizers (I) or (II) of the invention, comprising the step of providing a coating around a urea granule or prill, said coating comprising one or more compounds (b) as described, one or more compounds (c1) and/or (c2), and, optionally one or more compounds (e) as described. In one embodiment of the invention the urea coated is a standard urea. Urea granules of the invention can be used as such, or be blended with standard urea or possible other solid NPK fertilizers. Possibly the urea granule being coated contains a certain amount of elemental sulfur. In another embodiment of the invention, solid UFP particles are being coated this way. UFP particles of the invention can then be mixed with an aqueous urea to provide a fluid or liquid urea-based fertilizer. The aqueous urea can be Urea Ammonium Nitrate (UAN).

Coated urea particulates according to the invention may for instance be prepared by adding to a heated liquid urea at a temperature above about 120, 121, 122, 133, 134, or 135° C. one or more compounds (b), one or more compounds (c1) and/or (c2), and, optionally, one or more compounds (e) as herein described. Coated urea particulates according to the invention as such can be prepared in a suitable granulating unit, like of instance a granulation drum equipped with a spray drier.

When compounds (b) are added to a hot urea (molten or liquid), then it may be recommended to keep the retention time short and/or to add some additives that lower the urea melt temperature. Preferably less than about 60, 30, or 15 minutes pass between adding of the compounds (b) to the hot urea and granulation. Even more preferred is to have a retention time of at most about 60, 50, 40, 30, or 20 or even 15 seconds.

It is preferred that the temperature of the mixture containing compounds (a) and (b) and does not exceed about 250, 245, 240, 235, or 230° C., and preferably does not exceed about 220, 210, 205 or about 200° C.

Preferably the temperature of the hot urea (molten or liquid) is below about 230° C., more preferably below about 200° C. when adding compounds (b). Preferably this temperature is at most about 195, 190, 185, 180 or even at most about 175° C. An example of an additive that can be used to lower the melt temperature of urea is e.g. the urea-formaldehyde conditioning agent UF80 (a mixture of urea/formaldehyde/water in a ratio of 23/57/20, from Dynea).

An advantage of the processes of the invention is that the allow the flexibility of using operating temperatures that go from low (at most about 115° C., even lower under vacuum) to minimize product degradation, to high (preferably about 250° C. max, more preferably about 230° C. max) to optimize energy efficiency and equipment sizing still with low product degradation.

In any of the above processes, compounds (b) are generally provided in such amounts that the final product (II) obtained contains at least about 1, 1.5, 2, 2.3 or 2.5 wt % of compounds (b). Preferably this amount is at least about 3, 3.5, 4, 4.5 or 5 wt %. In a particular embodiment of the invention, the amount of compounds (b) is at least about 10 wt %, more preferably at least about 15 wt %. Generally the amount of compounds (b) in the final product (II) is at most about 90, 85, 80, 75, 70, 65, 60, 55, 50, 45, 40, 35, 34, 33, 32, or 31 wt %. In a particular embodiment of the invention, the amount of compounds (b) is at most about 30, 29, 29, 28, 27, 26, or 25 wt %, at most about 24, 23, 22, 21, 21, 20, 19, 18, 17, 16, or 15 wt %, even at most about 14, 13, 12, 11, 10 wt %.

In any of the above processes, the amount of urea in the final product (II) obtained is at least about 1, 1.5, 2 or 2.5 wt %. Preferably this amount is at least about 3, 3.5, 4, 4.5 or 5 wt %. In a particular embodiment of the invention, the amount of urea is at least about 15, 20, 25, 30 or 35 wt %. In another particular embodiment of the invention, the amount of urea is at least about 60, 65, 66, 67, 68, 69 or 70 wt %. In a particular embodiment of the invention, the amount of urea in the stabilized fertilizers (I) or (II) is at least about 90, 91, 92, 93, 94, or 95 wt % up to about 99 or 98 wt %.

The amount of compounds (c1) and/or (c2) varies in accordance with the amount of compounds (b) being present and varies in function with the type of product being made. In a particular embodiment of the invention products (I) and (II) are being made that qualify as carrier materials for NBPT and/or DCD. In said case, the amount of urea (a) and of compounds (b) is kept low to have amounts of NBPT and/or DCD as high as possible.

In any of the above process water is preferably removed until the water content of the product obtained is from about 0.01 wt % to about 10 wt %, preferably from about 0.02 wt % to about 8 wt %. The final water content in products (I) or (II) preferably is less than about 8 wt %, preferably less than about 7, 6, 5, 4 or 3 wt %. Preferred in the invention are stabilized fertilizer compositions (I) and (II) that have the lowest possible amount of free water. It was noticed that in accordance with the invention it is possible to obtain stabilized fertilizer compositions (I) and (II) with a water content of at most about 2, 1.5, or 1 wt %. It was even possible to produce stabilized fertilizer compositions (I) and (II) with a water content of at most about 0.5, 0.4, 0.3, or even 0.2 wt %. The 'water content' refers herein to the free water content as can be determined by a Karl Fischer method.

Stabilized fertilizers (I) and (II) obtained via any of the above processes can be stored or transported in bulk or they can be packed in bags, containers, cubicles, etc. of various sizes that preferably are well sealed. Though the solid products of the invention are less hygroscopic in nature then the products sold for photographic applications, it is recommended to avoid contact with moisture and/or atmospheric gasses such as oxygen, nitrogen, etc., or to provide a suitable moisture-repellent coating. Optimally, driers or desiccants like a silica gel or anti-caking agents are added to further improve the product's shelf life. Preferably products (I) or (II) of the invention are properly packaged in sealed containers, bags, etc. with little to no head space (e.g. head space of less than about 1%).

Characteristics of the Stabilized Fertilizers (I) and (II) of the Invention

Preferred in the context of the invention, are products (I) and (II) that have compounds (b) spread substantially homogeneously within the solid particulate being produced. In a particular embodiment of the invention, also compounds (c1) and/or (c2) are spread substantially homogeneously within the solid particulate. When the latter are added at later stages, for instance by spraying the compounds on top of solid granules within a drying process (coating process), then a core-shell type kind of product is possible with compounds (b) and/or (c) present primarily within the outer layers of the solid particulate. A particular embodiment of the invention relates to a urea granule or and UFP particle coated with a layer comprising compounds (b) and compounds (c1) and/or (c2). The coating applied can consist of one or more layers. In a particular embodiment of the invention the particulates of the invention are provided with a coating that brings anti-caking and/or moisture repellent properties.

Below an idea is given of the different types of products (I) and (II) that can be made in accordance with the invention.

In an embodiment of the invention, the product (I) or (II) is a solid thiosulfate-urea based product. In another embodiment of the invention, the product (I) or (II) is a polysulfide-urea based product. In yet another embodiment of the invention, the product (I) or (II) is a (bi)sulfite-urea based product. In yet another embodiment of the invention, the product (I) or (II) can contain a mixture of compounds (b):

a mixture of compounds (b1) and (b2), of compounds (b1) and (b3), of compounds (b2) and (b3) or of compounds (b1), (b2) and (b3). Information on preferred compounds (b1), (b2) and (b3) can be found above.

In its simplest form products (I) and (II) of the invention contain water (f), urea (a), compounds (b) and compounds (c1) and/or (c2) only. Preferred ratios of urea (a) to compounds (b) have been provided above.

Generally the amount of urea, relative to the total of a+b, is at least about 2, 2.2, 2.3, 2.4, 2.5, 2.6, 2.7 or 3 wt %. Typically this amount is at most about 98, 97, 96, 96, 95, 94, 93, 92, 91 or 90 wt %. In a particular embodiment, compounds (a) are present in an amount of at least about 4, 5, 6, 7, 8, 9 or 10 wt %, relative to the total of a+b. In a particular embodiment, this amount is at least about 20, 30, or 40 wt %, relative to the total weight of a+b.

In a particular embodiment, the amount of urea in the products (I) or (II) is at least about 1, 2, 3, 4 wt %, and at most about 90, 89, 88, 87, 86 or 85 wt %. In a particular embodiment of the invention, the amount of urea is at most about 84, 83, 82, 81, 80, 79, 78, 77, 76 or 75 wt %.

Generally the amount of compounds (b), relative to the total of a+b, is at least about 1.5, 2, 2.1, 2.2, 2.3, 2.4, 2.5, 2.6, 2.7 or 3 wt %. Typically this amount is at most about 98, 97, 96, 96, 95, 94, 93, 92, 91 or 90 wt %. More preferably the amount of compounds (b) is at least about 4 wt %, relative to the total of a+b. In a particular embodiment, this amount is at least about 20, 30, or 40 wt %, relative to the total weight of a+b.

In a particular embodiment of the invention, urea is present in product (I) or (II) of the invention in an amount of at least about 3, 4, 5, or 6 wt %, preferably at least about 7, 8, 9, 10 wt %, more preferably at least about 11, 12, 13, 14, or 15 wt % and more.

In a particular embodiment of the invention, urea is present in these products in an amount of at least about 85, 86, 87, 88, or 89 or at least about 90 wt %.

In another particular embodiment of the invention, is present in an amount of at most about 15, 14, 13, 12, 11, or 10 wt %, even at most about 9, 8, 7, 6 or 5 wt %.

Compounds (b) are generally present in products (I) or (II) the invention in an amount of from about 1 wt % to about 99 wt %, more preferably from about 2 wt % to about 98 wt %, and most preferably from about 2.3 wt % to about 97.7 wt %, from about 2.4 wt % to about 97.6 wt % or from about 2.5 wt % to about 97.5 wt %. Preferably this amount is at most about 95, 94, 93, 92 or 91 wt %, more preferably at most about 90, 89, 88, 87 or 86 wt %, even more preferably at most about 85, 84, 83, 82 or 81 wt %, and most preferably at most about 80 wt %. In a particular embodiment, products (I) or (II) of the invention comprise at least about 6, 7, 8, 9, or 10 wt % and preferably at most about 95, 94, 93, 92, or 91 wt %, more preferably at most about 90, 89, 88, 87, 86 or 85 wt % of compounds (b).

At high concentrations (above about 85 wt %, and more in particular above about 90 wt %) the compounds benefit from a further drying by vacuum to remove extra water. This improved their storage stability. The use of dryers, desiccants, storage in closed boxes and/or vacuum storage or other ways to avoid contact with air (oxygen) and/or humidity may help reduce deliquescence that can start after a couple of days, or usually after a couple of weeks. When stored well sealed, then products tested were found to remain stable for up to one year.

In a particular embodiment of the invention, the amount of compounds (b) in these products is at least about 2, 2.5, 3, 3.5, 4, 4.5 or 5 wt %, even at least about 10, 11, 12, 13, 14, of 15 wt %, up to at most about 90, 85 80, 75, 70, 65, 60, 55, 50, 45, 40, 35, 34, 33, 32, 31, or 30 wt %, and preferably up to at most about 29, 28, 27, 25, 24, 23, 22, 21, 20 wt %. Preferably, compounds (b) in this embodiment are chosen from those compounds that have a well-established urease and/or nitrification inhibiting effect so that much less of compounds (c) are needed.

In another particular embodiment of the invention, the amount of compounds (b) in these products is at most about 15, 14, 13, 12, or 11 wt %, more preferably at most about 10, 9 or 8 wt %. In this embodiment, the amount of compounds (b) is often at least about 1, 2, 3, 4 or 5 wt %.

When present, then urease inhibitors (c1) are generally present in an amount from about 0.001 wt % to about 85 wt %. Preferably this amount is at most about 80, 75, 70, 60 or 50 wt %. Usually this amount is at least about 0.01, 0.02, 0.03, or 0.04 wt %. Usually this amount is at most about 40, 39, 38, 37, or 36 wt %, most often at most about 35, 34, 33, 32, 31 or 30 wt %. A person skilled in the art will know how to adapt the amounts of NBPT in function of the way the solid products of the invention are made and used in the field, so that the quantity of NBPA added is about 900 mk/kg urea.

In one particular embodiment, the amount of compounds (c1) present in products (I) and (II) of the invention is from about 0.001 wt % to about 1.5 wt %, preferably from about 0.01 wt % to about 1 wt %. The concentration of NBPT in urea granules is generally from about 0.04 wt % to about 0.1 wt %. When present in outer layers only, then this amount may be at most about 0.5, 0.4, 0.3 or 0.2 wt %, even at most about 0.1, 0.09, 0.08, 0.07 or 0.06 wt %. Often at least about 0.0001, preferably at least about 0.02, 0.03 or 0.04 wt % of NBPT is present. Higher amounts can be present, for instance in carrier materials for compounds (c1). These materials can contain from about 0.1 to about 85, 80, 75, 70, 65, 60, or 55, preferably to about 50, 45, 40, 39, 38, 36, 37, 35, 34, 33, 32, 31 or 30 wt % of compounds (c1). Compounds (c1) are herein preferably present in an amount of at least about 1, 1, 5, 2, 2.5, 3, 3.5, 4, 4.5 or 5 wt %.

When present, then nitrification inhibitors (c2) are generally present in an amount from about 0.01 to about 85 wt %, often to about 80 wt %. Preferably this amount is at most about 75, 70, 65, 60, 55 or 50 wt %. Often compounds (c) are present in an amount from about 0.04 wt % to about 40 wt %. Preferably this amount is at least about 0.1 wt %, more preferably at least about 0.2 wt %. Usually this amount is at most about 39, 38, 37, or 36 wt %, and in general it at most about 35, 34, 33, 32, 31 or 30 wt %.

In urea granules, the amount of compounds (c2) is often from about 0.01 wt % to about 4 wt %, more preferably from about 0.1 wt % to about 3 wt %. When present in outer layers only, then this amount may be lower. Higher amounts can be present, for instance in carrier materials for compounds (c2). These materials can contain from about 0.5 wt % to about 85, 80, 75, 70, 65, 60, 55 wt %, preferably to about 50, 45, 40, 39, 38, 36, 37, 35, 34, 33, 32, 31 or 30 wt % of compounds (c2). In a particular embodiment of the invention, this amount is at least about 1, 1, 5, 2, 2.5, 3, 3.5, 4, 4.5 or 5 wt %.

In general, the total amount of compounds (c) is at most about 85, 80, 75, 70, 65, 60, or 55 wt %. Most often this amount as at most about 50, 45, 40, 35, 30 or even 25 wt %. In a particular embodiment of the invention though, compounds (c) are present in an amount of from about 15 wt % to about 50 wt %, from about 20 wt % to about 50 wt %, more preferably from about 25 wt % to about 40 wt %.

In particular embodiment of the invention, compounds (c1) and/or (c2) are present in an amount from about 0.01 wt % to about 20 wt %.

In all of the above, a preferred compound (c1) is NBPT, and a preferred compound (c2) is DCD.

A particular embodiment of the invention, relates to products (I) or (II) of the invention that have NBPT but no DCD. Another particular embodiment of the invention, relates to products (I) or (II) that have DCD but no NBPT.

Preferably the stabilized fertilizer compositions (I) and (II) of the invention are substantially free from organic solvents including having a boiling point above about 150° C. Preferably they are also substantially free from organic solvents including having a boiling point above about 125° C. In a particular embodiment of the invention are substantially free from any organic solvents.

In another particular embodiment of the invention, compounds (c1) and/or (c2) are present in an amount from about 2.5 wt % to about 50 wt %. Preferably compounds (c1) and/or (c2) are then present in an amount of at least about 10, 11, 12, 13 or 14 wt %, preferably at least about 15, 16, 17, 19, 19 or 20 wt %, often at least about 25 wt %. In this embodiment, the amount of compounds (a) is usually from about 1 wt % to about 15, 14, 13, 12 or 10 wt % at most. In this embodiment, the amount of compounds (b) is usually from about 1 wt % to about 15, 14, 13, 12, 11 or 10 wt % at most. The sum of the weight percentages of course does not exceed 100 wt %.

In yet another embodiment of the invention, compounds (b) are present in an amount of at least about 1, 1.5, 2, 2.5, 3, 3.5, 4, 4.5 or 5 wt %. The amount of compounds (b) is then often at most about 30, 25, 24, 23, 22, 21, 21, 20, 19, 18, 17, 16, 15, 14, 13, 12, 11, or 10 wt %. Products (I) and (II) to be used as N&S fertilizer often contain at most about 85, 84, 83, 82, or 81 wt %, even at most about 80, 79, 78, 77, 76 or 75 wt % of urea. An often used N&S fertilizer is for instance a 25-0-0-6S fertilizer. Compounds (c1), where present are then typically present in an amount from about 0.01 wt % to about 0.1 wt %. Compounds (c2), where present are then typically present in an amount from about 0.1 wt % to about 4 wt %. The sum of the weight percentages of course does not exceed 100 wt %.

A particular embodiment of the invention relates to urea granules that comprise compounds (b) and compounds (c1) and/or (c2). Preferably the urea granule of the invention has an nitrogen (N) content of at least about 35, 36, or 37 wt %, preferably at least about 38, 39 wt % or even more preferably at least about 40, 41, 42 wt %.

The amount of water (f) in products (I) or (II) of the invention, after drying, usually is from about 0.01 wt % to about 10 wt %, preferably from about 0.02 wt % to about 8 wt %. The final water content in products (I) or (II) preferably is less than about 8 wt %, preferably less than about 7, 6, 5, 4 or 3 wt %. More preferably the water content is less than about 2, 1.5, 1 wt %. In a particular embodiment, the water content is less than about 0.5, 0.4, 0.3, or even 0.2 wt %. The 'water content' refers herein to the free water content as can be determined by a Karl Fischer method.

In a particular embodiment of the invention, water (f) and compounds (a)+(b)+(c) are the primary constituents of the products (I) and (II) of the invention. Preferably the sum of their weight percentages (of a+b+c+f) is at least about 80 wt %, most often at least about 85 wt %. Usually this sum is at least about 90, 91, 92, 93, 94, 95, 96, 97, 98, 99 wt % and in particular this sum may equal 100 wt %. Of course, the sum of the weight percentages of a+b+c+e+d+f will not exceed 100 wt %.

Products (I) and (II) of the invention have many different applications and may vary widely in composition. In one embodiment of the invention e.g., the sum of the weight percentages of a+b+c+d+e+f=100%, while in other embodiments the sum of a+b+c+e+f=100%, the sum of a+b+c+d+f=100%, the sum of a+b+c+f=100% (possible impurities and possible degradation by-products herein included).

Products (I) or (II) of the invention in general contain less than about 5 wt % of oxidation by-products of compounds (b). Examples of oxidation by-products include the corresponding sulfates and/or sulfites and also elemental sulfur. Preferably less than about 3 wt %, more preferably less than about 2 wt %, and even more preferably less than about 1 wt % of these oxidation by-products of compounds (a) are formed during the drying process.

In a preferred embodiment of the invention, at least compounds (b) are spread substantially homogeneously within solid particulates (I) or (II) of the invention. Also, compounds (c) and/or (c2) preferably are spread substantially homogeneously within solid particulates (I) or (II) of the invention. Alternatively, compounds (b) and (c1) and/or (c2) can be present primarily in the outer layers of the solid particulates being formed. A particular embodiment of the invention relates to urea granules or UFP particles surrounded by a coating that comprises compounds (b) and also compounds (c1) and/or (c2). Various forms and variations are thus possible, depending on how and at what moment the different compounds are added.

A Wide Variety of End Uses

Fertilizers

Products (I) and (II) of the invention have a wide applicability but are in particular highly suited for use in or as fertilizer compositions. They were found highly compatible with standard liquid and solid NPK fertilizers or fertilizer ingredients.

Hence, provided is also a fertilizer composition, liquid or solid, comprising a stabilized fertilizer composition (I) or (II) of the invention.

Provided in the invention is in particular a liquid fertilizer that comprises a stabilized fertilizer composition (I) or (II) of the invention. Products (I) or (II) of the invention, when added to a liquid fertilizer preferably are re-solubilized in water or another suitable liquid, possibly UAN (urea ammonium nitrate fertilizer) before adding them to a liquid fertilizer. The liquid fertilizer composition of the invention can contain further standard ingredients like UAN (like UAN 28, UAN 32, etc.). Other liquid fertilizers with which products of the invention are compatible are liquid ammonium polyphosphates (APP), monoammonium phosphates (MAP), diammonium phsophates (DAP), urea-triazone liquid fertilizers like N-SURE®, etc.

Possibly the liquid fertilizer can also contain a certain amount of solid fertilizers like additional urea, a solid ammonium sulfate, a solid magnesium sulfate, a solid potassium sulfate, a solid ammonium nitrate, a solid calcium nitrate, a solid potassium nitrate, etc.

Provided in the invention is in further also a solid fertilizer composition that comprises materials of the invention, in particular products (I) or (II) of the invention. These materials can be easily blended with standard solid fertilizers such as dry urea, a solid ammonium sulfate, a solid magnesium sulfate, a solid potassium sulfate, a solid ammonium nitrate, a solid calcium nitrate, a solid potassium nitrate, etc.

A particular fertilizer of the invention is a protected urea containing at least one thiosulfate (b1) and/or at least one polysulfide (b2) and/or at least one (bi)sulfite (b3) in an amount that they exert urease and/or nitrification inhibitory effects. This kind of urea fertilizer is typically provided under the form of a urea granule. In a particular embodiment of the invention the urea granule contains NBPT. In a particular embodiment of the invention the urea granule contains DCD. In a particular embodiment of the invention the urea granule contains both NBPT and DCD.

A particular embodiment of the invention relates to products (I) or (II) of the invention that can be characterized as solid carriers for nitrogen inhibitors like NBPT and/or DCD. These carrier materials can be incorporated into liquid and/or to solid fertilizers. An advantage of products of the invention is that they require less organic solvents like NMP, DMSO, etc.

The invention will further be elucidated with the following examples, without being limited thereto.

EXAMPLES

General Set Up

In the following a specified amount of dry urea is mixed with the respective thiosulfate such as ammonium thiosulfate, potassium thiosulfate, calcium thiosulfate, magnesium thiosulfate, calcium polysulfide or ammonium (bi)sulfite. DCD and NBPT were added in dry form. Solid products with varying amounts of compounds (a), (b) and (c) were prepared and all were found to have a good shelf life when stored in a sealed container.

Throughout the invention and in the Examples section the following methods were used:
- Determination of Kjeldhal nitrogen in fertilizers is by AOAC Method 978.02.
- The amount of sulfur (S) is determined by AOAC Gravimetric Method No 980.02
- The amount of thiosulfates is determined via ion chromatography using an AS 11 4×250 mm with guard column AG11 4×50 mm. Mobile phase: 20 mM KOH (isocratic). Flow rate: 1 ml/min. Detection: conductivity.
- Amount of potassium (K) was determined by AAS (Atomic Absorption Spectroscopy).

Example 1

40 grams of a 24 wt % calcium thiosulfate liquid solution was mixed with 55 grams of dry urea, 1 grams of solid NBPT and 4 grams of solid DCD. The mixture was heated with or without vacuum as above and the water was removed. The resulting solid was further air dried and packaged as such. The solid product contains near 14 wt % of calcium thiosulfate (confirmed via ion chromatography). When no vacuum was used then the mixture was heated to about 100° C., the point where solids started forming in the mixture. In both cases the mixture was pre-heated to about 60° C. to have the urea dissolved quickly. When using vacuum of about 0.7 bar (22 mmHg), solids started to form in the mixture at about 80° C.

Example 2

197.6 grams of urea, 199.46 grams of water, 0.999 grams of NBPT, 3.95 grams of DCD, and 52.4 grams of a 50 wt % ammonium thiosulfate were mixed. Total volume was 400 ml. Theoretically, this provides a blend of 20-0-0-3S-1 wt % NBPT-4 wt % DCD in liquid state. The mixture was heated at about 100-110° C. The volume was reduced from 400 ml to around 180 ml. The mixture turned cloudy and solids formed in the solution. Heating stopped and the mixture cooled at ambient. The resulting solid was further air dried and packaged as such. The solid product contains about 11.6 wt % of ammonium thiosulfate.

Example 3

Larger scale samples were prepares using a Kemutec reactor dryer of 400 liter. A solid stirrer scrapes the product from the inside of the reactor and breaks the products. The dryer can be placed under vacuum for drying so that drying temperatures can be reduced to about 70° C.

First, the thiosulfate, urea, solid NBPT and some extra water are loaded in the reactor. At about 60° C., when everything is in solution, the water is evaporated under vacuum while stirring at low speed. After evaporation, the reactor is cooled to about 25° C. and the vacuum is broken with a stream of $N_2$. To avoid bigger clumps, the product is sieved (5 mm sieve).

A sample was prepared with 6 wt % of $CaS_2O_3$ and with 1 wt % of NBPT. It was found stable after drying: no degradation and/or discoloration was observed. The amount of residual free water was from about 0.4 wt % to about 0.1 wt %.

Liquid and Solid End Fertilizers:

Example 4

| Urea, CaTs ®, NBPT and DCD blend: 15-0-0 + 4 Ca + 0.0375 NBPT and 0.75 DCD | |
|---|---|
| Product | Lbs/ton |
| Urea | 643 |
| CaTs ® | 1333 |
| NBPT | 0.75 |
| DCD | 15.0 |
| Water added | 8.25 |

Example 5

| Urea, KTS ®, NBPT, DCD blend: 21-0-10 + 0.0525 NBPT + 0.75 DCD | |
|---|---|
| Product | Lbs/ton |
| Urea | 867.4 |
| KTS ® | 800 |
| NBPT | 1.0 |
| DCD | 21.0 |
| Water added | 310.6 |

Example 6

| Urea, MagThio ®, NBPT and DCD blend: 15-0-0 + 2.0 Mg + 0.037 NBPT + 1.15 DCD | |
|---|---|
| Product | Lbs/ton |
| Urea | 630 |
| MagThio ® | 1000 |

-continued

Urea, MagThio ®, NBPT and DCD blend:
15-0-0 + 2.0 Mg + 0.037 NBPT + 1.15 DCD

| Product | Lbs/ton |
|---|---|
| NBPT | 0.75 |
| DCD | 15.0 |
| Water added | 354.25 |

Example 7

Urea, Thio-Sul ®, NBPPT and DCD blend:
20-0-0 + 8 S + 0.037 NBPT + 1.0 DCD

| Product | Lbs/ton |
|---|---|
| Urea | 680 |
| Thio-Sul ® | 615 |
| NBPT | 0.78 |
| DCD | 20 |
| Water added | 684.4 |

In keeping with fertilizer regulations, all percentages for NBPT and DCD in Examples 4-7 are expressed relative to the total weight of the product. Removal of water from the liquid mixtures herein described leads to a solid particulate according to the invention.

The amount of compounds (b) on a dry weight basis is about 16.7 wt % in Example 4; about 20 wt % in Example 5, about 9.5 wt % in Example 6 and about 17.8 wt % in Example 7.

In the above, 'CaTs®' refers to the Tradename of a commercial 24-25 wt % calcium thiosulfate; 'KTS®' refers to the Tradename of a commercial 50 wt % potassium thiosulfate solution; 'MagThio®' refers to the Tradename of a commercial 24 wt % magnesium thiosulfate solution; and 'Thio-Sul®' refers to a commercial 57-60 wt % ammonium thiosulfate solution Products according to the invention were found to be stable over longer period. There was no visible sign of product degradation when stored at normal conditions (room temperature, ambient pressure). When products stored for several months, for instance 2, 4, 5 months, are solubilized in water, there is no significant amount of yellow particles significative of elemental sulfur being formed. There is also no significant loss of compounds (c), such as NBPT.

The invention claimed is:

1. A stabilized fertilizer composition (I) comprising
Urea (a),
One or more thiosulfates (b),
One or more urease inhibitors (c1) and/or one or more nitrification inhibitors (c2), optionally provided in one or more carriers (d), compounds (c1, c2) being different from thiosulfates (b),
Optionally one or more additives (e) different from any of the above,
Water (f) in an amount less than about 10 wt %,
wherein the ratio of urea (a) to iosulfates (b) is from 2:98 to 98:2;
wherein the amount of compounds (c) is at most about 55 wt %; and
wherein the stabilized fertilizer composition (I) is a solid particulate wherein at least urea (a) and thiosulfates (b) are spread substantially homogeneously within the particles of the solid particulate.

2. The stabilized fertilizer composition claim 1, wherein compounds (c) comprise NBPT and/or DCD.

3. The stabilized fertilizer composition of claim 2, wherein the amount of NBPT is from about 0.04 wt % to about 1 wt %.

4. The stabilized fertilizer composition of claim 2, wherein the amount of NBPT is from about 0.001 wt % to about 0.5 wt %.

5. The stabilized fertilizer composition of claim 2, wherein the amount of DCD is from about 0.01 wt % to about 4 wt %.

6. The stabilized fertilizer composition of claim 1, wherein the amount of compounds (c) is from about 0.0001 wt % to about 50 wt %.

7. The stabilized fertilizer composition of claim 1, comprising from about 90 wt % to about 99 wt % of urea.

8. The stabilized fertilizer composition of claim 1, wherein the amount of compounds (c) is from about 15 wt % to about 50 wt %, wherein the amount of urea is at most about 10 wt %, and wherein the amount of thiosulfates (b) is at most about 10 wt %.

9. The stabilized fertilizer composition of claim 1, comprising at least about 0.5 wt % of thiosulfates (b).

10. The stabilized fertilizer composition of claim 1, being substantially free from organic solvents including having a boiling point above about 150° C.

11. A process for making a stabilized fertilizer composition (II) according to claim 1, said process comprising the steps of:
(i) Providing a mixture of urea (a), of one or more thiosulfates (b) and one or more
compounds (c), said mixture containing water (f),
(ii) Optionally, adding one or more additives (e) as recited,
(iii) Optionally, adding extra water (f),
(iv) Obtaining a substantially homogeneous mixture,
(v) Removing water from the homogeneous mixture until a product (II) is obtained with a
water content of at most about 10 wt %;
wherein compounds (c) are selected from one or more urease inhibitors (c1) and from one or more nitrification inhibitors (c2);
wherein the ratio of urea (a) to thiosulfates (b) is from 2:98 to 98:2;
wherein the amount of compounds (c) is at most about 55 wt %; and
wherein the stabilized fertilizer composition (II) is a solid particulate wherein at least urea (a) and thiosulfates (b) are spread substantially homogeneously within the particles of the solid particulate.

12. The process of claim 11, wherein the temperature of the mixture containing urea and thiosulfates (b) does not exceed about 250° C.

13. The process of claim 12 wherein the temperature of the mixture containing urea and thiosulfates (b) does not exceed about 85° C.

14. The process of claim 11 wherein in step (i) thiosulfates (b) are provided as a solution in water and/or wherein in step (i) thiosulfates (b) are provided in solid form.

15. The process of claim 11, further comprising a granulation step.

16. The process of claim 11, wherein the urea (a) has a temperature of at least about 130° C. or is a urea melt.

17. A product obtained via the process of claim 11, which is a protected urea granule comprising at least about 90 wt % of urea.

18. The product of claim 17 having a nitrogen (N) content of at least about 40 wt %.

19. The product of claim 17 wherein compounds (b) and (c) are
- spread substantially homogeneously within a urea granule, and/or
- present in a coating applied onto a urea granule.

\* \* \* \* \*